US010805195B2

(12) United States Patent
Caputo, II et al.

(10) Patent No.: US 10,805,195 B2
(45) Date of Patent: Oct. 13, 2020

(54) NETWORK OPERATIONAL FLAW DETECTION USING METRICS

(71) Applicant: Level 3 Communications, LLC, Broomfield, CO (US)

(72) Inventors: Pete Joseph Caputo, II, Highlands Ranch, CO (US); Sergey Yermakov, Littleton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 16/554,556

(22) Filed: Aug. 28, 2019

(65) Prior Publication Data

US 2019/0386903 A1    Dec. 19, 2019

Related U.S. Application Data

(63) Continuation of application No. 15/918,775, filed on Mar. 12, 2018, now Pat. No. 10,404,561, which is a continuation of application No. 14/738,380, filed on Jun. 12, 2015, now Pat. No. 9,917,753.

(51) Int. Cl.
*H04L 12/26* (2006.01)
*H04L 12/24* (2006.01)

(52) U.S. Cl.
CPC ...... *H04L 43/0823* (2013.01); *H04L 41/0213* (2013.01); *H04L 41/0233* (2013.01); *H04L 41/0823* (2013.01); *H04L 43/08* (2013.01); *H04L 41/069* (2013.01); *H04L 41/0686* (2013.01)

(58) Field of Classification Search
CPC ............. H04L 43/0823; H04L 41/0233; H04L 41/0823; H04L 43/08; H04L 41/0213; H04L 41/069; H04L 41/0686
See application file for complete search history.

(56) References Cited

U.S. PATENT DOCUMENTS

| | | | |
|---|---|---|---|
| 6,343,320 B1 * | 1/2002 | Fairchild | H04L 41/0213 709/224 |
| 6,708,137 B2 | 3/2004 | Carley | |
| 7,076,547 B1 * | 7/2006 | Black | H04L 41/5003 709/224 |
| 7,860,960 B1 | 12/2010 | Knight et al. | |
| 9,396,157 B2 * | 7/2016 | Cradick | G06F 16/24568 |
| 9,800,489 B1 * | 10/2017 | Polyanskiy | H04L 43/12 |
| 10,263,868 B1 * | 4/2019 | Baldi | H04L 67/22 |

(Continued)

OTHER PUBLICATIONS

Extended European Search Report, dated Oct. 5, 2018, Application No. 16808088.5, filed Jun. 6, 2016; 10 pgs.

(Continued)

*Primary Examiner* — Jimmy H Tran

(57) ABSTRACT

In an embodiment, a computer-implemented method receives and monitors performance metrics from network element. The method also includes receiving periodic control metrics corresponding to object instances. Performance metrics and control metrics provide information about operation of object instances. By monitoring the metrics, a network server is able to detect an operational flaw in the network. Monitoring the performance and control metrics in real time increases the speed of detecting any operational flaw in the network.

20 Claims, 7 Drawing Sheets

(56) References Cited

U.S. PATENT DOCUMENTS

| | | | |
|---|---|---|---|
| 2003/0105976 A1 | 6/2003 | Copeland | |
| 2006/0072583 A1* | 4/2006 | Sanda | H04L 41/5009 370/395.53 |
| 2006/0268933 A1* | 11/2006 | Kellerer | H04L 67/14 370/469 |
| 2009/0016335 A1* | 1/2009 | Bays | H04L 45/34 370/389 |
| 2009/0094195 A1* | 4/2009 | Black | H04L 67/02 |
| 2009/0138549 A1* | 5/2009 | Huang | G06Q 10/06 709/203 |
| 2009/0138945 A1 | 5/2009 | Savchuk | |
| 2009/0217291 A1 | 8/2009 | Errickson | |
| 2010/0064039 A9* | 3/2010 | Ginter | H04L 63/145 709/224 |
| 2011/0149969 A1 | 6/2011 | Beecroft | |
| 2012/0072575 A1* | 3/2012 | King | H04L 43/04 709/224 |
| 2012/0239793 A1 | 9/2012 | Gangalapur | |
| 2013/0080600 A1* | 3/2013 | Santosuosso | G06F 16/28 709/219 |
| 2013/0080654 A1* | 3/2013 | Branson | G06F 16/24568 709/231 |
| 2013/0103832 A1* | 4/2013 | Cradick | H04L 65/607 709/224 |
| 2013/0117847 A1 | 5/2013 | Friedman et al. | |
| 2013/0262500 A1 | 10/2013 | Bratspiess | |
| 2013/0290966 A1* | 10/2013 | Branson | G06F 11/3433 718/102 |
| 2013/0343213 A1* | 12/2013 | Reynolds | H04L 43/045 370/252 |
| 2014/0019609 A1* | 1/2014 | Williams | H04L 43/028 709/224 |
| 2014/0059200 A1* | 2/2014 | Nguyen | H04L 43/026 709/224 |
| 2014/0122557 A1* | 5/2014 | Branson | H04L 67/2833 709/201 |
| 2014/0280895 A1* | 9/2014 | Branson | H04L 65/60 709/224 |
| 2015/0074108 A1* | 3/2015 | Branson | H04L 43/0888 707/736 |
| 2015/0074258 A1* | 3/2015 | Ferreira | H04L 43/024 709/224 |
| 2015/0236959 A1* | 8/2015 | Cai | H04L 47/24 709/235 |
| 2015/0333992 A1* | 11/2015 | Vasseur | H04L 12/4641 370/252 |
| 2016/0036663 A1* | 2/2016 | Bley | H04L 43/045 709/224 |
| 2016/0065438 A1* | 3/2016 | Bird | H04L 43/0876 709/223 |
| 2016/0080230 A1* | 3/2016 | Anand | H04L 47/32 709/224 |
| 2016/0092247 A1* | 3/2016 | Branson | G06F 11/3404 703/22 |
| 2016/0246846 A1* | 8/2016 | Barsness | G06F 9/50 |
| 2016/0364283 A1 | 12/2016 | Baron | |
| 2016/0366035 A1 | 12/2016 | Ortega | |
| 2016/0366039 A1 | 12/2016 | Caputo, II et al. | |
| 2017/0116059 A1 | 4/2017 | Wolf | |
| 2017/0195383 A1* | 7/2017 | Branson | G06F 11/0751 |
| 2017/0339203 A1* | 11/2017 | Kekre | H04L 65/4084 |
| 2018/0167292 A1* | 6/2018 | Cao | G06F 16/24568 |
| 2018/0205622 A1 | 7/2018 | Caputo, II et al. | |
| 2018/0297402 A1* | 10/2018 | Hsiao | G06F 16/2477 |
| 2019/0098076 A1* | 3/2019 | Moon | H04L 43/08 |
| 2019/0182118 A1* | 6/2019 | Manning | H04L 43/08 |
| 2019/0286509 A1* | 9/2019 | Baron | G06F 11/0772 |
| 2019/0391893 A1* | 12/2019 | Baron | G06F 11/3006 |
| 2020/0044921 A1* | 2/2020 | Srinivas | H04L 43/12 |
| 2020/0117530 A1* | 4/2020 | Baron | G06F 11/00 |
| 2020/0136940 A1* | 4/2020 | Gandham | H04L 43/0888 |

OTHER PUBLICATIONS

International Preliminary Report on Patentability dated Dec. 12, 2017, Int'l Appl. No. PCT/US16/036025, Int'l Filing Date Jun. 6, 2016; 12 pgs.

International Search Report dated Aug. 26, 2016, Int'l Appl. No. PCT/US16/036025, Int'l Filing Date Jun. 6, 2016; 3 pgs.

Written Opinion of the International Searching Authority dated Aug. 26, 2016, Int'l Appl. No. PCT/US16/036025, Int'l Filing Date Jun. 6, 2016; 10 pgs.

* cited by examiner

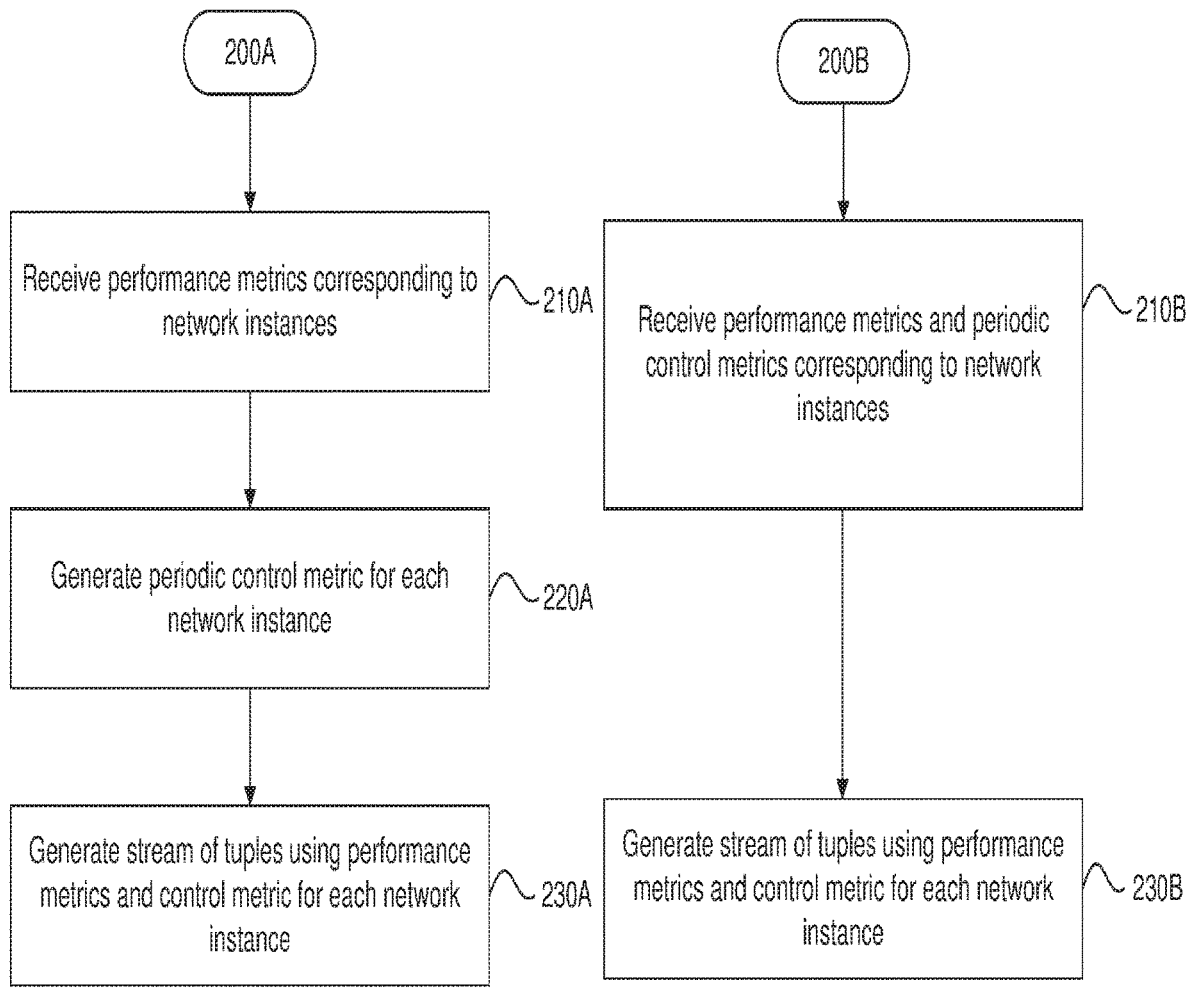

500

| | | ID=0 | ID=1 | ID=2 | | ID=N |
|---|---|---|---|---|---|---|
| | | \multicolumn{5}{c}{instance$_{ID}$ 620} | |
| Metric flags 640 | metric$_{IN}$ | 1 | 0 | 1 | . . . | 0 |
| | metric$_{OUT}$ | 1 | 1 | 0 | . . . | 0 |

FIG. 6

NETWORK OPERATIONAL FLAW DETECTION USING METRICS

CROSS-REFERENCE TO RELATED APPLICATIONS

This application claims the benefit under 35 U.S.C. § 120 as a continuation of U.S. patent application Ser. No. 15/918,775, filed Mar. 12, 2018, now U.S. Pat. No. 10,404,561, which is a continuation of U.S. patent application Ser. No. 14/738,380, filed Jun. 12, 2015, now U.S. Pat. No. 9,917,753, the entire contents of each of which are incorporated herein by reference.

BACKGROUND

Technical Field

Embodiments generally relate to monitoring network operation.

Background

A communication network may, for example, provide a network connection that allows data to be transferred between two geographically remote locations. A network may include network elements connected by links. The network elements may be any type of managed device on the network, including routers, access servers, switches, bridges, hubs, IP telephones, IP video cameras, computer hosts, and printers. Network elements can be physical or logical and can communicate with one another via interconnected links.

Network operation may be impaired for different reasons. For example, component failure, including link failures or network element failure, may cause operational flaws in the network. Network operational flaws may also be caused by misconfiguration or malfunction of network elements or congestion in the network.

Networks may provide clients with statistics, reports, and other information related to their elements and their performance. For example, clients may wish to see how much their traffic is delayed by the network, whether the service is meeting service level agreements, whether the network elements are functioning as intended, etc. Such performance information helps to discover operational flaws in the network.

Network management servers may use performance metrics that provide information about network performance. To collect metrics, a standard protocol, such as Simple Network Management Protocol (SNMP), may be used. SNMP is part of the Internet Protocol Suite as defined by the Internet Engineering Task Force (IETF). It includes of a set of standards for network management, including an application layer protocol, a database schema, and a set of data objects.

The database schema SNMP uses a management information base (MIB). The MIB describes network objects. The objects can be specified by object identifiers (OID). An object can include one or more object instances.

SNMP may support a query providing for discovery of the instances available for an object. The instances may be identified by suffixes to the object identifiers. The instance identifier may be used to retrieve metric values for the instance. Performance metric values stored in a database may be used to determine if there is an operational flaw with the corresponding object instance.

SUMMARY

In an embodiment, a computer-implemented method detects operational flaws in a network. The method includes receiving, by a network management server, metrics corresponding to object instances of objects associated with network elements. The network management server generates a stream of tuples, wherein a tuple includes a network element identifier, a metric, and an object instance identifier. A metric is either a performance metric or a control metric corresponding to the object instance, and wherein the control metric appears periodically in the stream. A monitoring server monitors the stream of tuples and sets a flag when a first performance metric corresponding to the object instance is received. When detecting a control metric corresponding to the object instance the monitoring server determines whether the first flag is set. The monitoring server creates an alert if the first flag is not set.

Method and computer-readable medium embodiments are also disclosed.

Further embodiments and features, as well as the structure and operation of the various embodiments, are described in detail below with reference to accompanying drawings.

BRIEF DESCRIPTION OF THE DRAWINGS

The accompanying drawings are incorporated herein and form a part of the specification.

FIG. 2A illustrates a method of generating a stream of tuples corresponding to object instances.

FIG. 2B illustrates a method of generating a stream of tuples corresponding to object instances.

FIG. 3B illustrates a method of monitoring a stream of tuples object instance operational flaw similar to the method in FIG. 3A, but with a.

FIG. 6 illustrates another example memory a monitoring server uses to monitor performance metrics of an object instance.

In the drawings, like reference numbers generally indicate identical or similar elements. Generally, the left-most digit(s) of a reference number identifies the drawing in which the reference number first appears.

DETAILED DESCRIPTION

A network management server may receive performance metrics corresponding to instances of network objects associated with network elements. Network objects may include network services, applications or processes for a client. A network management server may collect metrics from network elements by sending request messages. Alternatively, network elements may send the metrics to the network management server. After receiving the metrics, network management server generates a stream of tuples. Each tuple corresponds to an object instance and may include an identification of the corresponding network element, a performance metric value from the object instance, and an identification of the object instance.

The performance metrics may be used to determine operation status of their corresponding object instances. A performance metric value may for example describe operational status of its corresponding object instance. The performance metrics may be stored in a database.

According to embodiments, a monitoring server monitors the stream of tuples that the network management server generates. The monitoring server may receive the stream in parallel with a database or before the stream is sent to the database. The monitoring server may therefore monitor the performance metrics in the stream in real time to detect any possible operational flaws without a need to access the database.

In embodiments, by monitoring the frequency or value of specific performance metrics in the stream of tuples, the monitoring server is able to detect any flaws in operation of the instances of network objects associated with the performance metrics. By monitoring of the tuple stream in real time using the monitoring server, as opposed to using a database, embodiments can reduce the time to detect any flaws in operation of object instances.

Figure 1:
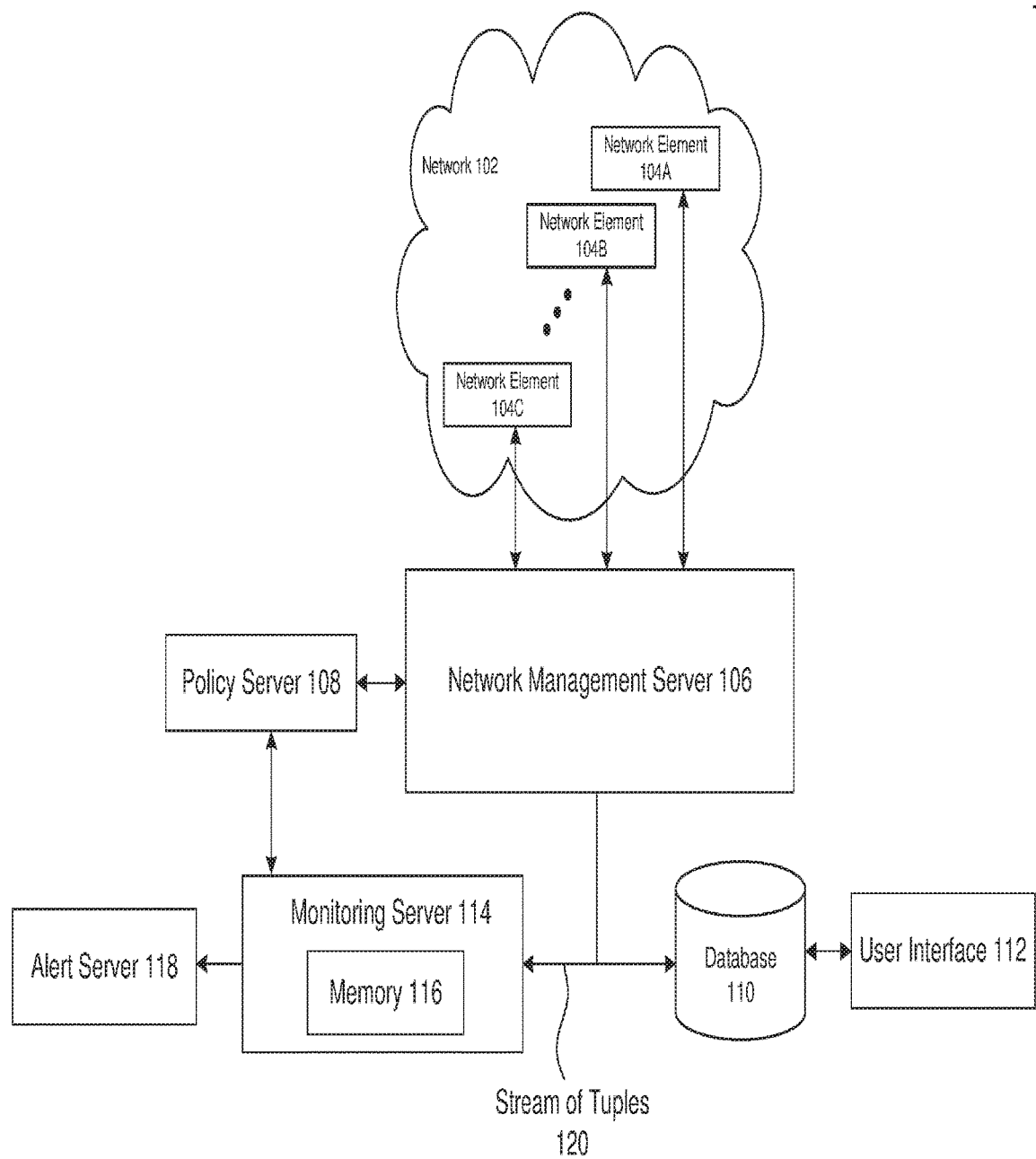
FIG. 1 illustrates a network environment where a monitoring server monitors performance of object instances.
Figure 4:
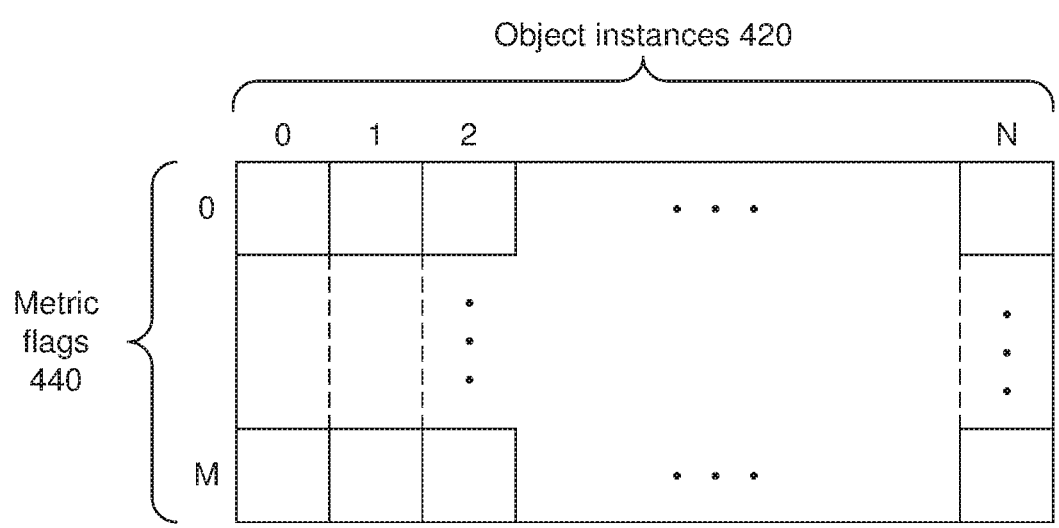
FIG. 4 illustrates an example memory a monitoring server uses to monitor performance metrics of object instances.
Figure 5:
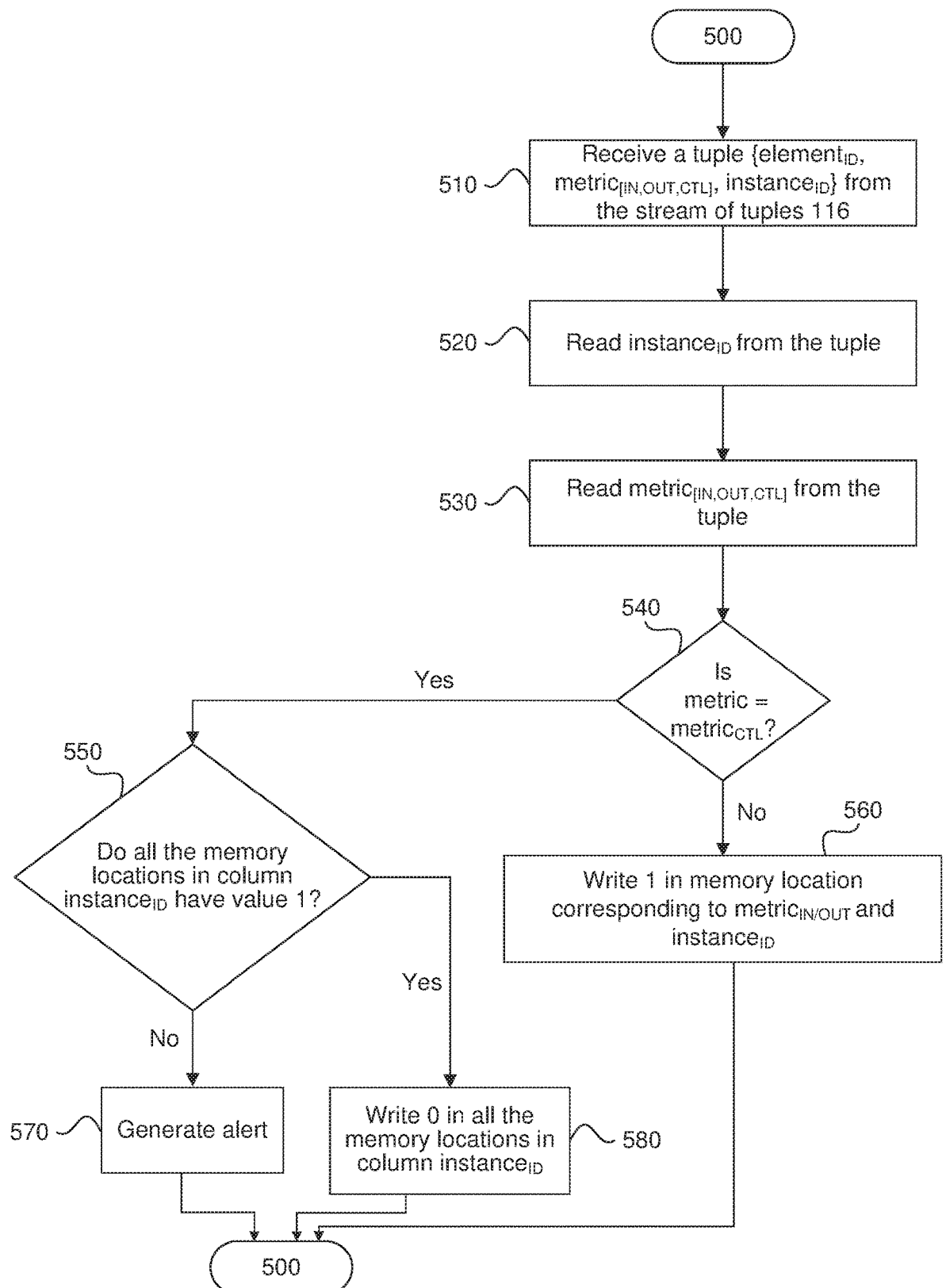
FIG. 5 illustrates an example of a method for monitoring a stream of tuples object instance operational flaw.

In the description that follows, a system where the monitoring server monitors the stream is first described with respect to FIG. 1. The network management server's creating a tuple stream is described with respect to FIGS. 2A and 2B. How the monitoring server uses the tuple stream to detect network flaws is described with respect to FIGS. 3A and 3B. An example memory used by monitoring server is described with respect to FIG. 4. FIG. 5 walks through an example of the monitoring server's operation. FIG. 6 provides another example memory used by monitoring server.

FIG. 1 illustrates a network environment 100 that includes a plurality of network elements 140A-C in network 102. Network elements 140 may be connected to a network management server 106. Network management server 106 receives metrics corresponding to network object instances on the network elements.

Network management server 106, using performance metrics received from network elements in network 102, creates a stream of tuples. Each tuple in the stream corresponds to an instance of an object associated with a network element and may include an identifier of the network element, a metric corresponding to the object instance, and an identifier of the object instance.

Network element identifier may for example be an IP or MAC address of a network device. As mentioned above, the objects may be specified using OIDs. Each OID may be a sequence of integers separated by decimal points. An example of an OID is 1.3.6.1.2.1.4.6. Each OID may have a textual description as well. For example the textual description of 1.3.6.1.2.1.4.6 may be iso.org.dod.internet.mgmt-.mib-2.ip.ipForwDatagrams. In that example, the ipForw-Datagrams object may be an integer counter that stores the number of forwarded datagrams at a router. As mentioned above, the specification may include a list of specific objects, for example, 1.3.6.1.2.1.4.4, 1.3.6.1.2.1.4.5, and 1.3.6.1.2.1.4.6. Or the specification may designate an entire portion of the object hierarchy, for example, 1.3.6.1.2.1.4.*. Objects can be have instances. When the objects are stored in a treelike hierarchy, the instances may be all of the object's children. They may, for example, be an entire subtree with the object specified by an object identifier as its root. The requests and response may be formatted according to SNMP. The object instances may also have an object ID. For example, the object instances may have the object's ID, appended with a new suffix.

Examples for performance metrics may include passive metrics such as InOctets or OutOctets provided by a network switch. Other examples of performance metrics may include active metrics such as round trip time (RTT), latency, or jitter of traffic on a service provided by the network. For example, a tuple may be {Switch Port MAC address, Performance Metric, Instance Identifier}. In an embodiment, network management server 106 uses the method illustrated in FIG. 2A or 2B to create the stream of tuples.

Network management server 106 may be connected to a database 110. Performance metrics generated by network management server 106 may be stored in database 110 and accessible to users through user interface 112.

In an embodiment, monitoring server 114 receives the stream of tuples from network management server 106. Monitoring server 114 monitors performance metrics received in the stream of tuples 120 to detect any flaw with operation of object instances corresponding to the performance metrics. Monitoring server 114 monitors the stream of tuples 120 as it is generated by the network management server 106 without a need to query database 110. Monitoring server 114 may therefore monitor the performance stream of tuples in real time to detect any operational flaws in the network 102. In this way, monitoring server 114 detects an operational flaw in the network much quicker than a user accessing database 110 may realize the same operational flaw.

Figure 3A:
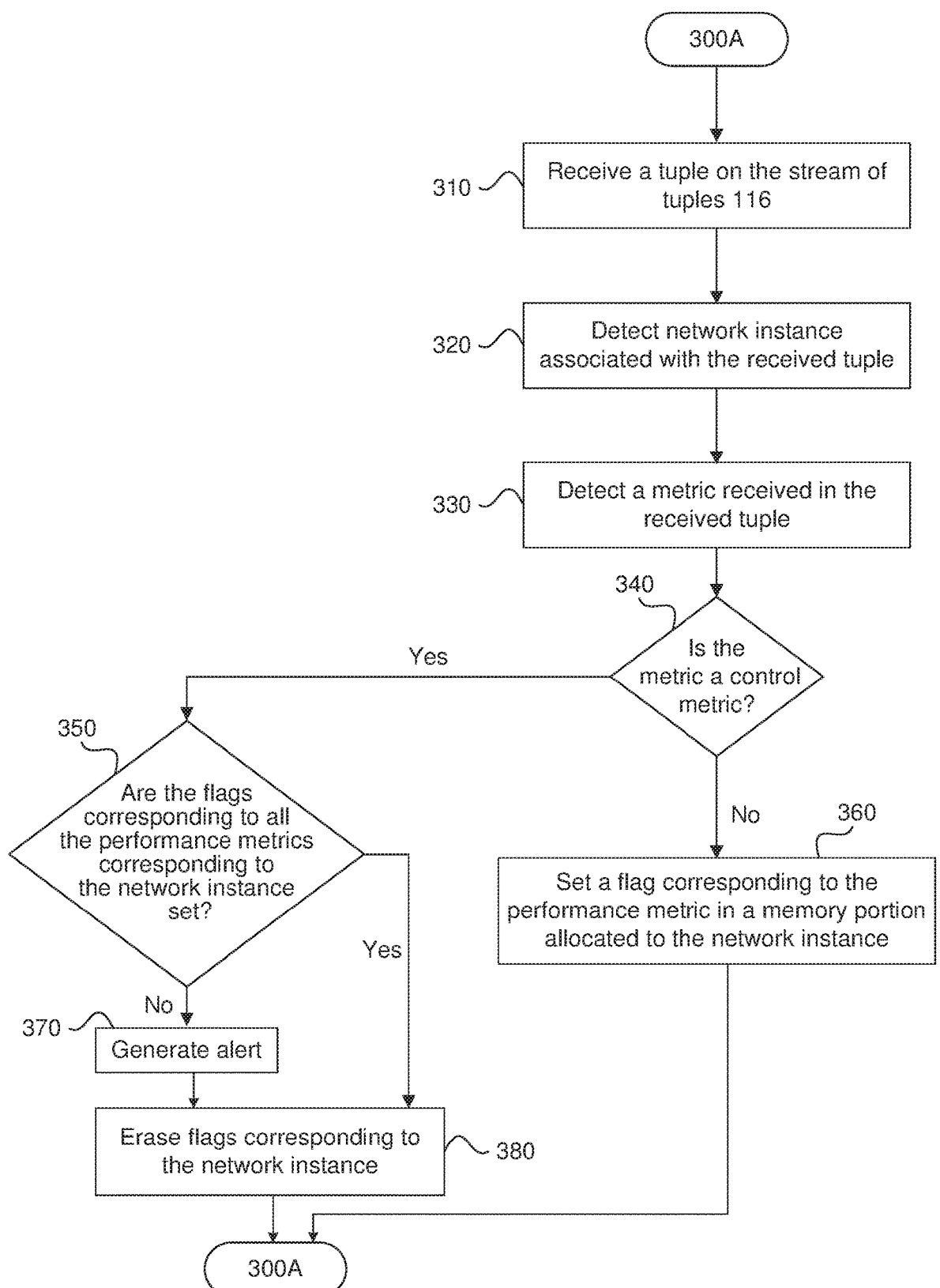
FIG. 3A illustrates a method of monitoring a stream of tuples corresponding to object instances for detecting operational flaws.
Figure 3B:
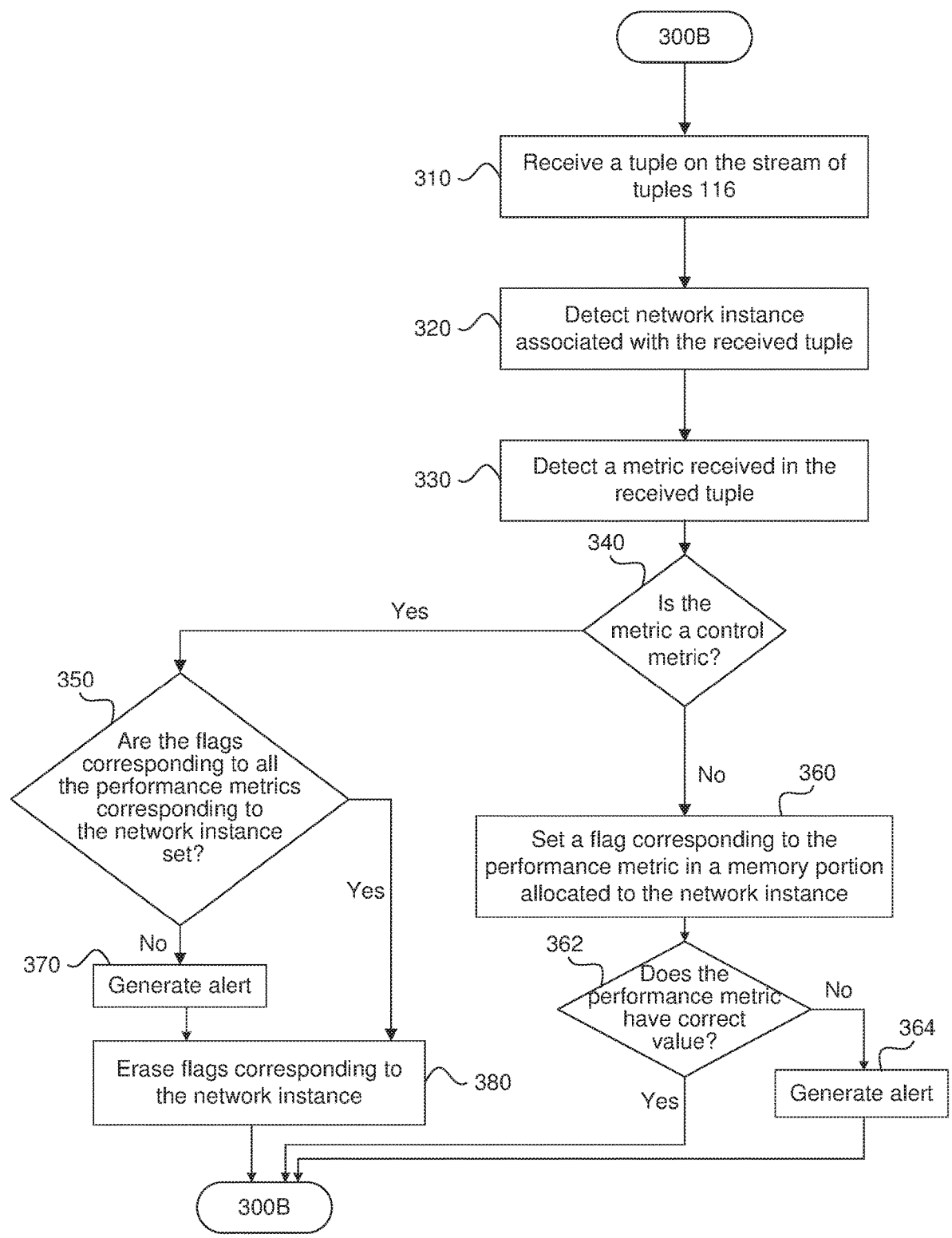

In an embodiment, monitoring server 114 uses the method illustrated in FIG. 3A or 3B to detect an operational flaw of an object instance. Monitoring server 114 may temporarily store flags corresponding to the received performance metrics in a memory 116. Monitoring server 114 may detect flaws when a flag shows missing performance metric for an object instances when the metric is expected. Monitoring server 114 may also detects operational flaw when the value of the performance metric is not as it is expected to be for the corresponding object instance.

When monitoring server 114 detects an operational flaw in an object instance, it may inform alert server 118 of operational flaw in the object instance, the corresponding performance metric indicating the flaw, and identification of associated network element and object instance. Alerts server 118, using this information, alerts a network operator of the operational flaw. Alert server 118 may send the network operator information in the tuple that contains the metric indicating of the flaw. Alert server 118 may inform the network operator of the operational flaw through email, or any other messaging system using wired or wireless networks, for example cellular network.

FIG. 2A illustrates a method of generating a stream of tuples, which may be used in operation of network management server 106. At step 210A, network management server 106 receives performance metrics corresponding to object instances in network 102. Network management server 106 may also receive identification of the corresponding object instance and element when receiving a performance metric in step 210A.

At step 220A, network management server 106 generates control metrics for each object instance. Control metrics are generated periodically. The frequency of the control metrics may be determined according to a business rule set in policy module 108 and communicated to the network management server 106. Policy module 108 may set the frequency of the control metric for an object instance. In embodiments, policy module 108 may set the frequency of the control metric for an object instance less that the frequency of any performance metric associated with the object instance.

The control metrics act as a heartbeat for a network element. They set a pace for arrival of the performance metrics. Control metrics may notify the monitoring server of arrival expectancy of performance metrics for a corresponding network instance. Control metrics may not have a value describing performance or functionality of a network instance, but their arrival frequency sets a pace for receiving and evaluating performance metrics. Control metrics of a network instance arrive less frequently than any performance metrics for the network instance. Therefore when a control metric corresponding to a network instance is arrived, network monitoring server expects that all the performance metrics for the network instance to have been arrived.

At step 230A, network management server 106 may generate the stream of tuples using performance metrics and control metric for each object instance. In an embodiment, network management server 106 generates and sends a tuple for each performance metric that it receives in step 210A. Network management server 106 may generate tuples including the control metric of an object instance according to the frequency of the control metric for the object instance as specified by policy server 108.

After receiving a performance metric, network management server 106 may generate a tuple that includes the performance metric, identification of the corresponding object instance, and identification of the corresponding network elements. When a control metric is generated according to a business rule set by policy server 108 for an object instance, network management server 106 generates and sends a tuple that includes the control metric, identification of the corresponding object instance, and identification of the corresponding network element. Therefore tuples that include control metrics appear periodically for each object instance, according to the business rule set by policy server 108 for each object instance. Network management server 106 may also format the tuple according to an instruction set by policy module 108.

FIG. 2B illustrates a method of generating a stream of tuples by network management server 106 according to another embodiment. At step 210B, network management server 106 receives performance metrics and periodic control metrics corresponding to object instances in network 102.

At step 230B, network management server 106 may generate the stream of tuples using performance metrics and control metrics for each object instance. In an embodiment, network management server 106 generates and sends a tuple for each performance or control metric that it receives. After receiving a performance metric, network management server 106 may generate a tuple that includes the performance metric, identification of the corresponding object instance, and identification of the corresponding network element. After receiving a control metric, network management server 106 generates and sends a tuple that includes the control metric, identification of the corresponding object instance, and identification of the corresponding network element. Therefore tuples that include control metrics appear periodically for each object instance, according to the frequency they are received by network management server 106.

In embodiments, network management server 106 receives performance metrics from network 102 and monitoring server 114 uses a least frequent performance metric corresponding to a network instance as a control metric for the instance. Policy server 108 may configure network management server 106 and monitoring server 114 to use the least frequent metric of a network instance as the control metric. The least frequent performance metric may function as both a performance and the control metric for the network instance. Thus, control metric role can be assumed by a regular "performance" metric, for example ifAlias (1.3.6.1.2.1.31.1.1.1.18). In that case, the control metric injection/generation described in step 220A may be unnecessary.

FIG. 3A illustrates a method of monitoring streams of tuples 120 by monitoring server 114 for detecting an operational flaw in network 102. At step 310, monitoring server 114 may receive a tuple on stream of tuples 120. At step 320 monitoring server 114 may detect the object instance associated with the received tuple, using the field in the tuple that contains the identification of the object instance.

At step 330, monitoring server 114 may detect a metric in the received tuple. Monitoring server 114 may gain information about formatting of the tuple, including location of the metric or other information in the tuple, from policy server 116.

At step 340, monitoring server 114 determines whether the metric in the received tuple is a performance metric or a control metric. If it is a performance metric, at step 360, monitoring server 114 will set a flag in memory 116 corresponding to the performance metric. In an embodiment, monitoring server 114 sets the flag in a portion of memory 116 allocated to the object instance. An example embodiment of allocating portions of memory 116 to object instances is shown in FIG. 4.

In normal operation of an object instance, all tuples including performance metrics for the object instance are generated between two consecutive tuples including control metrics for the object instance. Monitoring server 114 therefore expects certain performance metrics for an object instance before the control metric for the object instance arrives. Monitoring server 114 may track what performance metrics to expect for an object instance from policy server 116. If monitoring server 114 does not receive all the performance metrics expected for the object instance by the time it receives the corresponding control metric, there is a flaw in operation of the object instance.

If at step 340, network management server 106 determines that the metric in the received tuple is a control metric, at step 350 monitoring server 114 determines whether all the flags indicating receipt of all the performance metrics expected for the object instance are set. If not all the flags are set, at step 370, monitoring server 114 informs alert server 118 to generate an alert. Monitoring server 114, at step 380, erases all the flags in the portion of memory 116 corresponding to the object instance and then continues to monitor the incoming tuples in method 300A.

If at step 350, monitoring server 114 determines that the flags corresponding to all the performance metrics are set, monitoring server 114, at step 380, erases all the flags in the portion of memory 116 corresponding to the object instance. Monitoring server 114 then continues to monitor the incoming tuples in method 300A.

In another embodiment, shown in FIG. 3B, after setting a flag corresponding to a received performance metric at step 360, monitoring server, at step 362, determines whether the performance metric has a correct value. Monitoring server 114 may gain information on the accepted values for performance metric of an object instance from policy server 108.

If monitoring server 114, at step 362 determined that the performance metric does not have a correct value, it will inform alert server 118 to generate an alert at step 364. The alert may include information indicating the received value of the performance metric, and the corresponding identification of the object instance and the network element. Other steps of method 330B in FIG. 3B is the same as method 300A in FIG. 3A.

FIG. 4 shows an embodiment for a portion of memory 116 used to store metric flags 440 corresponding to performance metrics received for object instances 420. In the example embodiment of FIG. 4, each columns is assigned to an object instance. Each row is assigned to a performance metric flag. A flag may be one bit in the memory. Value "1" may indicates that a flag is set and value "0" in a memory location may indicate that the flag is reset.

After a control metric arrives for an object instance, all the memory locations in the columns of the object instance are reset to "0." Any time a performance metric corresponding to a flag is arrived, the corresponding row in the object instance columns is set to "1." When next control metric arrives, monitoring server 114 by examining the column assigned to the object instance determines if all the locations corresponding to the performance metrics that should have arrived for the object instance have value "1."

FIG. 5 shows an example of method 300A and FIG. 6 shows an example of memory 400. Steps of method 500 are described below with reference to memory 600 in FIG. 6. In this example, the object instances may have two performance metrics iso.org.dod.internet.mgmt.mib-2.interfaces.ifTable.ifEntry.ifInOctets (ifInOctet for short, OID: 1.3.6.1.2.1.2.2.1.10) (metric$_{IN}$) and iso.org.dod.internet.mgmt.mib-2.interfaces.ifTable.ifEntry.ifOutOctets (ifOutOctet for short, OID: 1.3.6.1.2.1.2.2.1.16) (metric$_{OUT}$), and a control metric (metric$_{CTL}$). Monitoring server 114, at step 510 receives a tuple {element$_{ID}$, metric$_{[IN,OUT,CTL]}$, instance$_{ID}$} from stream of tuples 120. First field in the tuple, element$_{ID}$, includes an identification of the corresponding network element, for example IP or MAC address of a router. Second field may be ifInOctets metric (metric$_{IN}$), ifOutOctets metric (metric$_{OUT}$), or control metric (metric$_{CTL}$). The third field in the tuple instance$_{ID}$ includes an indication of the corresponding object instance. In normal operation of the object instance, tuples including metric$_{CTL}$ arrives less frequently than metric$_{IN}$ or metric$_{OUT}$ in the stream of tuples 120. Therefore when network management server 106 receives metric$_{CTL}$, it expects tuples that include metric$_{IN}$ and metric$_{OUT}$ to have already been received.

Monitoring server 114, at step 520, reads the third field instance$_{ID}$ in the received tuple. Monitoring server 114, at step 530 reads the second field which is the metric, from the tuple.

If monitoring server 114 at step 540 determines that the metric in the received tuple is a metric$_{IN}$ or metric$_{OUT}$, it will write value "1" in the corresponding memory location to the metric and the instance$_{ID}$. For example referring to FIG. 6, if metric$_{IN}$ is arrived for instance$_{ID}$=2, monitoring server 114 writes value 1 in the first row and the third column. Monitoring server 114 then continues to receive other tuples on the tuple stream. Because control metric for the instance$_{ID}$ arrives less frequently that all other metrics for instance, if there is no flaws in operation of the object instance, both memory bits for instance$_{ID}$ will be "1" when metric$_{CTL}$ arrives.

If monitoring server 114 at step 540 determines that the metric in the received tuple is a control metric, at step 550 it verifies whether metric$_{IN}$ and metric$_{OUT}$ bits in the memory column corresponding to instance$_{ID}$ have value "1." If they both have value "1," monitoring server 114 writes "0" on metric$_{IN}$ and metric$_{OUT}$ bits of instance$_{ID}$ column and continues to receive tuples on the tuple stream. If one or both of the values corresponding to instance$_{ID}$ in memory 600 is "0," monitoring server 114 informs alert server 118 to create an alert. Monitoring server 114 then resets both bits corresponding to instance$_{ID}$ and continues to receive tuples on the tuple stream.

CONCLUSION

Each of the blocks and modules in FIG. 1, 4, or 6 may be implemented in hardware, software, firmware, or any combination thereof.

Each of the blocks and modules in FIG. 1, 4, or 6 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, memory, and graphical user interface display. The computing device may also have multiple processors and multiple shared or separate memory components. For example, the computing device may be a part of or the entirety of a clustered computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present embodiments should not be limited by any of the above-described examples, but should be defined only in accordance with the following claims and their equivalents.

What is claimed is:

1. A computer-implemented method for detecting operational flaws in a network comprising network elements, the method comprising:

receiving, by a monitoring server, a stream of tuples, wherein a tuple of the stream of tuples comprises a network element identifier, a metric, and a network instant identifier;

determining the metric is at least one of an input metric, an output metric, or a control metric, wherein the metric is associated with the network instant identifier that identifies a network instance of one or more network instances;

accessing one or more memory locations associated with the one or more network instances, wherein a memory location associated with the network instant identifier contains a first bit and a second bit, wherein the first bit is associated with the input metric, and wherein the second bit is associated with the output metric;

verifying, when the metric is the control metric, that the first bit contains a first value or a second value;

verifying, when the metric is the control metric, that the second bit contains the first value or the second value;

storing the second value into the first bit and into the second bit, when the first bit and the second bit contain the first value; and transmitting a message to an alert server to create an alert associated with an operational flaw when the first bit and the second bit contain different values.

2. The computer-implemented method of claim 1, wherein the first value is "1," and wherein the second value is "0."

3. The computer-implemented method of claim 1, further comprising:
determining that the first bit contains the first value;
determining that the second bit contains the second value; and
determining that the operational flaw has occurred.

4. The computer-implemented method of claim 1, further comprising resetting the first bit and the second bit based on the alert.

5. The computer-implemented method of claim 1, wherein the computer-implemented method is performed in real-time.

6. The computer-implemented method of claim 1, further comprising monitoring the stream of tuples.

7. The computer-implemented method of claim 1, further comprising:
determining the metric is the input metric; and
storing the first value into the first bit.

8. The computer-implemented method of claim 1, further comprising:
determining the metric is the output metric; and
storing the first value into the second bit.

9. The computer-implemented method of claim 1, further comprising determining that an operational flaw has occurred based on the first bit containing the second value and the second bit containing the second value.

10. A network monitoring system for detecting operational flaws in a network comprising network elements, the network monitoring system comprising:
at least one memory that stores computer-executable instructions; and
at least one processor configured to access the at least one memory, wherein the at least one processor is configured to execute the computer-executable instructions to:
receive, by a monitoring server, a stream of tuples, wherein a tuple of the stream of tuples comprises a network element identifier, a metric, and a network instant identifier;
determine the metric is at least one of an input metric, an output metric, or a control metric, wherein the metric is associated with the network instant identifier that identifies a network instance of one or more network instances;
access one or more memory locations associated with the one or more network instances, wherein a memory location associated with the network instant identifier contains a first bit and a second bit, wherein the first bit is associated with the input metric, and wherein the second bit is associated with the output metric;
verify, when the metric is the control metric, that the first bit contains a first value or a second value;
verify, when the metric is the control metric, that the second bit contains the first value or the second value;
store the second value into the first bit and into the second bit, when the first bit and the second bit contain the first value; and
transmit a message to an alert server to create an alert associated with an operational flaw when the first bit and the second bit contain different values.

11. The network monitoring system of claim 10, wherein the first value is "1," and wherein the second value is "0."

12. The network monitoring system of claim 10, wherein the at least one processor is further configured to execute the computer-executable instructions to:
determine that the first bit contains the first value;
determine that the second bit contains the second value; and
determine that the operational flaw has occurred.

13. The network monitoring system of claim 10, wherein the at least one processor is further configured to execute the computer-executable instructions to reset the first bit and the second bit based on the alert.

14. The network monitoring system of claim 10, wherein the computer-executable instructions are performed in real-time.

15. The network monitoring system of claim 10, wherein the at least one processor is further configured to execute the computer-executable instructions to monitor the stream of tuples.

16. The network monitoring system of claim 10, wherein the at least one processor is further configured to execute the computer-executable instructions to:
determine the metric is the input metric; and
store the first value into the first bit.

17. The network monitoring system of claim 10, wherein the at least one processor is further configured to execute the computer-executable instructions to:
determine the metric is the output metric; and
store the first value into the second bit.

18. The network monitoring system of claim 10, wherein the at least one processor is further configured to execute the computer-executable instructions to determine that an operational flaw has occurred based on the first bit containing the second value and the second bit containing the second value.

19. A non-transitory computer-readable medium storing a computer program that, when executed on a computer system configured to receive and transmit source code, causes the computer system to perform instructions for detecting operational flaws in a network comprising network elements, the instructions configured to cause the computer system to:
receive, by a monitoring server, a stream of tuples, wherein a tuple of the stream of tuples comprises a network element identifier, a metric, and a network instant identifier;

determine the metric is at least one of an input metric, an output metric, or a control metric, wherein the metric is associated with the network instant identifier that identifies a network instance of one or more network instances;

access one or more memory locations associated with the one or more network instances, wherein a memory location associated with the network instant identifier contains a first bit and a second bit, wherein the first bit is associated with the input metric, and wherein the second bit is associated with the output metric;

verify, when the metric is the control metric, that the first bit contains a first value or a second value;

verify, when the metric is the control metric, that the second bit contains the first value or the second value;

store the second value into the first bit and into the second bit, when the first bit and the second bit contain the first value; and transmit a message to an alert server to create an alert associated with an operational flaw when the first bit and the second bit contain different values.

20. The non-transitory computer-readable medium of claim 19, wherein the operations further comprise:
determine that the first bit contains the first value;
determine that the second bit contains the second value; and
determine that the operational flaw has occurred.

* * * * *